(12) United States Patent
Belanger et al.

(10) Patent No.: US 8,170,038 B2
(45) Date of Patent: May 1, 2012

(54) TWO-LAYER SWITCH APPARATUS TO AVOID FIRST LAYER INTER-SWITCH LINK DATA TRAFFIC IN STEERING PACKETS THROUGH BUMP-IN-THE-WIRE SERVICE APPLICATIONS

(75) Inventors: Matthew T. Belanger, Holly Springs, NC (US); Gary R. Shippy, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 12/472,987

(22) Filed: May 27, 2009

(65) Prior Publication Data

US 2010/0303083 A1    Dec. 2, 2010

(51) Int. Cl.
*H04L 12/56* (2006.01)
(52) U.S. Cl. ........................................ 370/401
(58) Field of Classification Search .............. 370/250, 370/392, 395.5, 395.53, 401; 709/223, 224
See application file for complete search history.

(56) References Cited

U.S. PATENT DOCUMENTS

| 5,982,869 | A | 11/1999 | Lozano et al. |
|---|---|---|---|
| 6,950,394 | B1 | 9/2005 | Chou et al. |
| 7,107,352 | B2 | 9/2006 | Tuck, III et al. |
| 7,142,564 | B1 | 11/2006 | Parruck et al. |
| 7,697,525 | B2 | 4/2010 | Zelig et al. |
| 2003/0099194 | A1 | 5/2003 | Lee et al. |
| 2005/0265248 | A1 | 12/2005 | Gallatin et al. |
| 2006/0114899 | A1 | 6/2006 | Toumura et al. |
| 2006/0133280 | A1 | 6/2006 | Natchu |
| 2007/0086455 | A1 | 4/2007 | Allan et al. |
| 2007/0140250 | A1 | 6/2007 | McAllister et al. |
| 2007/0248086 | A1 | 10/2007 | Petersen |
| 2007/0258447 | A1 | 11/2007 | Raszuk et al. |
| 2007/0288615 | A1 | 12/2007 | Keohane et al. |
| 2008/0049621 | A1 | 2/2008 | McGuire et al. |
| 2008/0159138 | A1 | 7/2008 | Shepherd et al. |

(Continued)

FOREIGN PATENT DOCUMENTS

WO       WO 03/103237 A1      12/2003

OTHER PUBLICATIONS

Office Action, U.S. Appl. No. 12/467,367, Dec. 21, 2010.

(Continued)

*Primary Examiner* — Dang Ton
*Assistant Examiner* — Nourali Mansoury
(74) *Attorney, Agent, or Firm* — H. Barrett Spraggins; Cynthia G. Seal; Biggers & Ohanian, LLP.

(57) ABSTRACT

Link-level data communications carried out in a link-level data communications switching apparatus that includes modular link-level data communications switches; the switching apparatus is configured as two layers of link-level data communications switches; all the switches stacked by a stacking protocol that shares administrative configuration information among the switches and presents the switches as a single logical switch; the switching apparatus includes data communications ports coupling the switching apparatus to data communications networks and to service applications, each service application associated with a unique, link-level identifier; the switching apparatus includes rules governing the steering of packets among service applications and networks; including receiving, in the switching apparatus, packets directed to a destination network; and steering each packet among the service applications to the destination network in accordance with the rules, without using the link-level identifier of any service application.

18 Claims, 6 Drawing Sheets

U.S. PATENT DOCUMENTS

| | | |
|---|---|---|
| 2008/0216074 A1 | 9/2008 | Hass et al. |
| 2008/0317038 A1 | 12/2008 | Pasko et al. |
| 2009/0003317 A1 | 1/2009 | Kasralikar et al. |
| 2009/0103550 A1 | 4/2009 | Miyata et al. |

OTHER PUBLICATIONS

Notice of Allowance, U.S. Appl. No. 12/410,803, Sep. 20, 2010.
U.S. Appl. No. 12/410,803, filed Mar. 25, 2009, Belanger, et al.
U.S. Appl. No. 12/467,367, filed May 18, 2009, Belanger, et al.
U.S. Appl. No. 12/481,678, filed Jun. 10, 2009, Belanger, et al.
PCT Search Report, May 10, 2010; PCT Application No. PCT/EP2010/052749.
Bayle, et al.; Performance Measurements of MPLS Traffic Engineering and QoS; 2003.
Enterprise Ethernet Solutions-High Function Switch-Router; 2004; Xelerated and Brtoadcom.
Office Action, U.S. Appl. No. 12/472,987, Jul. 18, 2011.

TWO-LAYER SWITCH APPARATUS TO AVOID FIRST LAYER INTER-SWITCH LINK DATA TRAFFIC IN STEERING PACKETS THROUGH BUMP-IN-THE-WIRE SERVICE APPLICATIONS

BACKGROUND OF THE INVENTION

1. Field of the Invention

The field of the invention is data processing, or, more specifically, methods, apparatus, and products for link-level data communications.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer architectures have evolved to take advantage of the higher performance of the hardware, resulting in computer systems today that are much more powerful than just a few years ago.

One of the areas that has seen substantial improvement is data communications through packet switching. Today many systems provide processing of data communications packets that is transparent to the operations of the source computer, the sender, and the destination of the packets. That is, neither the source nor the ultimate destination of the packets is ever made aware that such transparent processing occurs. Such transparent processing may include for example security processing, load balancing functions among data communications equipment, statistical surveys, and so on. Such transparent processing can include processing by not just one, but several interim service applications, one providing security services, another performing statistical surveys, another performing load balancing, and so on.

When data packets are to be processed by several service applications the problem of routing the data stream from one service application to another naturally arises. For service applications that carry out packet analysis and therefore operate in 'bump-in-the-wire promiscuous mode,' that is, transparently and invisibly sitting between two or more networking devices listening to all packets exchanged between the devices, preserving the packet headers is required. Because such service applications commonly perform inspection on the packet headers and the payload, the entire packet—payload+headers—must be considered "payload" to this kind of service application. Each such bump-in-the-wire service application must return each packet it handles to the communications system with the original header addresses intact so as not to interfere with the overall transmission of the packet from its original source to its ultimate destination.

Prior art has attempted to solve this problem by encapsulating the entire packet—payload+headers—and wrapping it with a new header that specifies the routing of the packet to bump-in-the-wire applications. This new encapsulation header must be understood by all the various hardware, switches, NICs, and so on, and potentially even by the bump-in-the-wire service applications themselves. This requirement to process this additional layer of headers is a burden to hardware developers and application providers who must now design, develop, test, and support an additional configuration of their core product. In addition, some solutions require that application providers not only integrate new header processing, but also port their application to specific hardware and operating system platforms.

Another solution attempted in prior art was to modify packets in certain ways, such as changing the destination MAC address, for example. This option changes the packet and limits the ability to perform the types of analysis that rely on possession of the original addresses in the packet. Moreover, this solution requires hardware developers to provide additional modifications of routers, bridges, and switches that use it to track the original addresses and return them to the packets upon return from the bump-in-the-wire service applications.

SUMMARY OF THE INVENTION

Methods, apparatus, and products are disclosed for link-level data communications. Link-level data communications are carried out in a switching apparatus which includes modular link-level data communications switches disposed within a modular computer cabinet, the modular computer cabinet also having disposed within it a plurality of modular computer systems. The switching apparatus is configured as two layers of link-level data communications switches, a first layer and a second layer. The first layer switches are coupled for data communications to data communications networks. The first layer switches are also coupled to one another for link-level data communications by inter-switch links. Each first layer switch is also coupled for link-level data communications to each of the second layer switches. Each second layer switch is coupled for link-level data communications to at least one of the modular computer systems so that each second layer switch provides data communications connections to the switching apparatus only for service applications in the modular computer system to which a second layer switch is coupled. All of the switches that are stacked by a stacking protocol share administrative configuration information through the inter-switch links and all of the switches that are stacked by a stacking protocol are presented to the networks and to the modular computer systems as a single logical switch.

The switching apparatus also includes a plurality of data communications ports. At least two of the ports couple the switching apparatus to at least two data communications networks, and at least two additional ports are connected to service applications on at least two of the modular computer systems that carry out transparent, bump-in-the-wire data processing of data communications packets traveling among the networks. Each service application is associated with a unique, link-level identifier. The switching apparatus also includes rules governing the steering of data communications among the service applications and networks connected to the switching apparatus. Each rule includes an association of an ingress port and a switch egress. One or more of the rules may optionally also include at least one network code that identifies two networks between which packets may travel through the switching apparatus and a direction of travel between the two networks.

Link-level data communications include receiving, in the switching apparatus through an ingress port from a source network, data communications packets directed to a destination network. Each packet includes a source network address that identifies the source of the packet in the source network. Each packet optionally also includes a destination network address that identifies a destination of the packet in the destination network. Link-level data communications also includes steering by the switching apparatus each packet among the applications and through an egress port to the destination network. Such steering is carried out only in accordance with the rules, without using the link-level identifier of any service application, steering none of the packets through any of the inter-switch links among the first layer switches.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
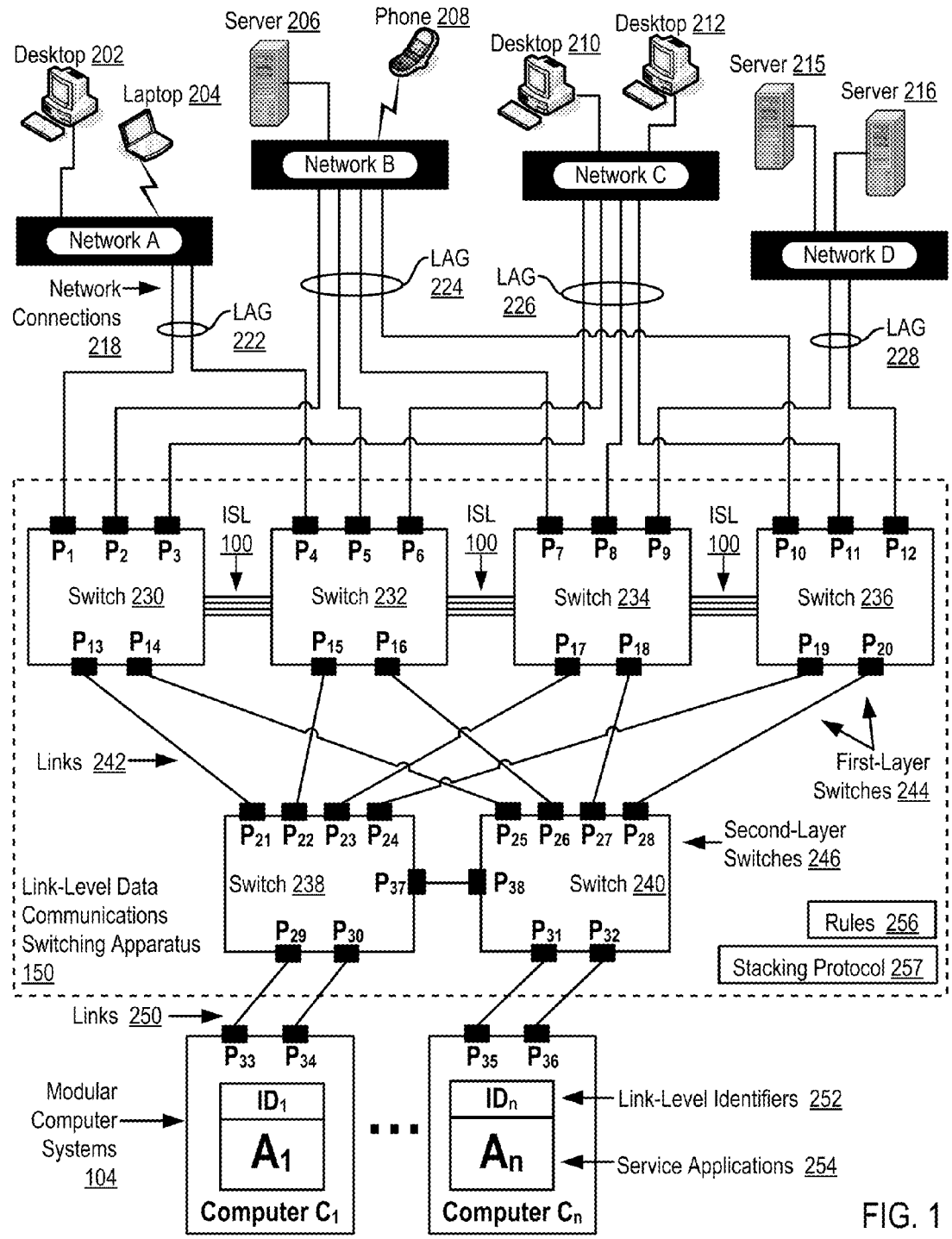
FIG. 1 sets forth a functional block diagram of automated computing machinery, example automated apparatus for link-level data communications according to embodiments of the present invention.

Example methods, apparatus, and products for link-level data communications in accordance with the present invention are described with reference to the accompanying drawings, beginning with FIG. 1. FIG. 1 sets forth a functional block diagram of automated computing machinery, example automated apparatus for link-level data communications according to embodiments of the present invention. The apparatus of FIG. 1 includes a link-level data communications switching apparatus (150) that includes modular link-level data communications switches (230, 232, 234, 236, 238, 240). The modular link-level data communications switches (230, 232, 234, 236, 238, 240) of FIG. 1 are disposed within a modular computer cabinet (102 on FIG. 1A) that also includes a plurality of modular computer systems (104) disposed within the modular computer cabinet. A modular computer cabinet is a frame or enclosure for mounting multiple computing devices. A modular computer cabinet may be embodied, for example, as a blade enclosure, a rack-mount chassis, and in other ways as will occur to those of skill in the art.

Figure 1A:
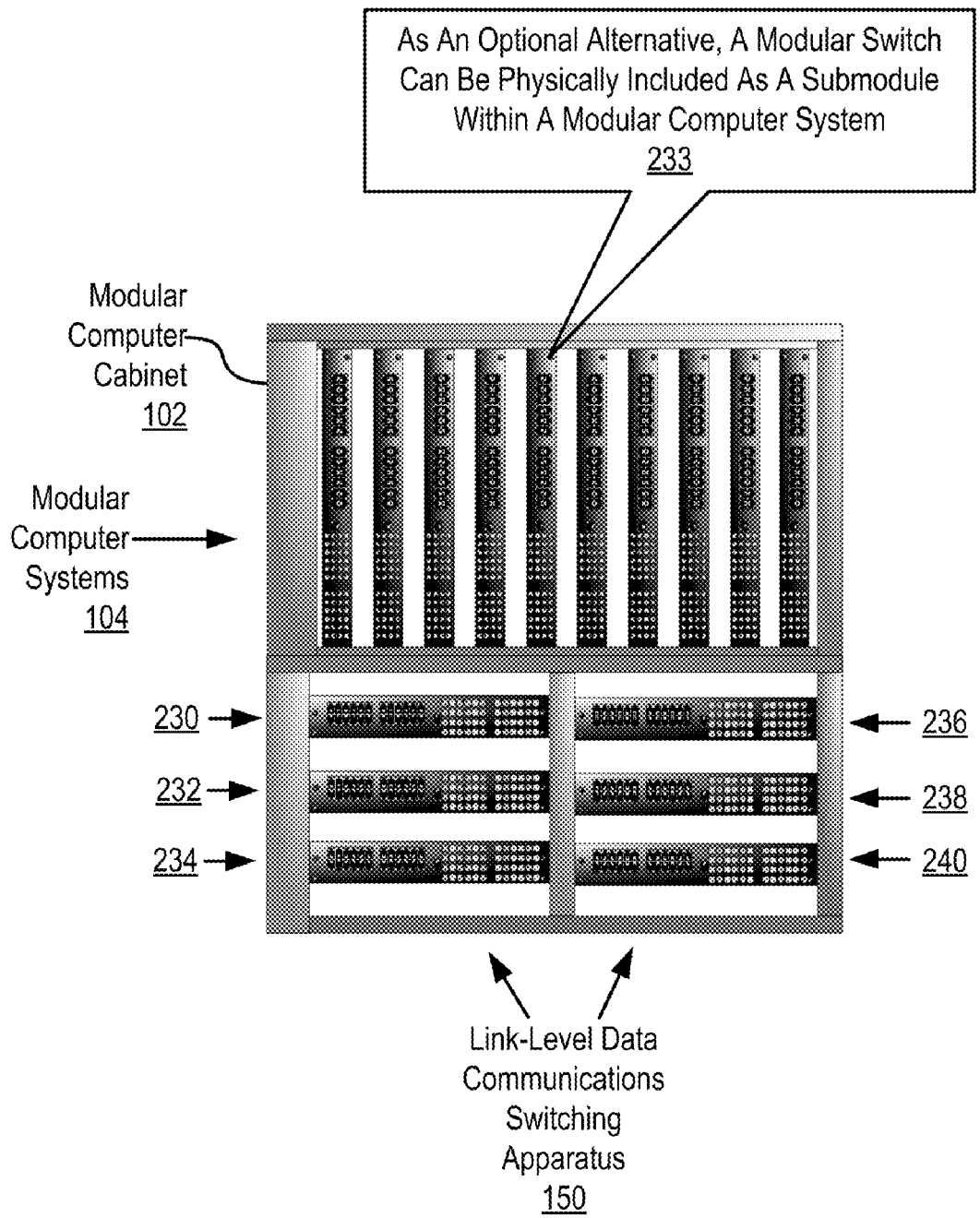
FIG. 1A sets forth a functional block diagram of automated computing machinery, an example modular computer cabinet according to embodiments of the present invention.

For explanation of the modular aspect of apparatus according to embodiments of the present invention, FIG. 1A illustrates a modular computer cabinet (102) that includes a number of modular computer systems (104) as well as link-level data communications switching apparatus (150) composed of several modular link-level data communications switches (230, 232, 234, 236, 238, 240). In the example of FIG. 1A, the modular computer systems (104) have the blade form factor, and the modular link-level data communications switches (230, 232, 234, 236, 238, 240) are rack-mount units. In the example of FIG. 1A, second-layer switches (238, 240) are depicted as modular link-level data communications switches mounted with the modular computer cabinet (102). Readers will recognize that as an optional alternative (233), the second-layer switches (238, 240) can be physically included as a sub-module within a modular computer system (104). Such second-layer switches can be embodied as, for example, a PCI Mezzanine Card, a Switched Mezzanine Card, a riser card, or other form of I/O adapter as will occur to those of skill in the art.

In the example of FIG. 1, the switching apparatus is connected through network connections (218) to several data communications networks (A, B, C, D) and through link-level data communications connections (250) to service applications (A . . . $A_n$) executing on computers ($C_1$ . . . $C_n$). A 'service application,' as the term is used here, is a module of automated computing machinery configured to carry out data processing tasks with regard to data communications packets without altering the packets. The packets travel on data communications networks between a source computer and a destination computer, and the service applications carry out data processing tasks regarding the packets in a manner that is transparent to the operations of the sources as well as the destinations of the packets. Such data processing with regard to the packets can be 'transparent' because the packets are not altered. The data processing tasks carried out by service applications include, for example, security processing, load balancing functions among data communications equipment, statistical surveys, and so on. Such transparent processing can include processing by not just one, but several interim service applications, one providing security services, another performing statistical surveys, another performing load balancing, and so on. The term 'bump-in-the-wire' as applied to the service applications here refers to the fact that, from the point of view of the source or destination, the service applications are physically in-line with the network architectures—as opposed to 'bump-in-the-stack' service applications that may manipulate layer 2/3 protocols like VLANs, ARP, and DHCP to control access to the service applications.

The terms 'link-level' and 'layer-2' both refer to the data link layer of the Open Systems Interconnection Reference Model ('OSI Model'). The data link layer is often referred to in this specification as the 'link layer' or the 'link level.' The first, third, and fourth layers of the OSI Model, also pertinent to this discussion, are the Physical Layer, the Network Layer, and the Transport Layer respectively. The Physical Layer of the OSI Model defines the electrical and physical specifications for data communications devices, typically devices connected in effect to a local area network or 'LAN.' Layer 3 or the Network Layer of the OSI Model provides functional and procedural means of transferring variable length data sequences from a source to a destination via one or more networks, generally including routing functions. The Network Layer is implemented with routers that communicate with one another according to data communications protocols. The well known Internet Protocol ('IP') operates generally as an OSI Network Layer data communications protocol. In fact, although IP is definitely not the only Network Layer protocol, IP is so ubiquitous at this point in time as to be almost a synonym for Network Layer functionality. Examples of other layer 3 protocols include ICMP, IGMP, and IPsec. The Transport Layer provides reliable data transfer services to the other layers. The Transport Layer controls the reliability of a given link through flow control as well as segmentation and desegmentation of packets. Transport Layer protocols are typically connection oriented. By far the most common examples of Transport Layer protocols are the Transmission Control Protocol ('TCP') and the User Datagram Protocol ('UDP'). Examples of other layer 4 protocols include DCCP, SCTP, RSVP, and ECN.

The data link layer of the OSI Model is implemented with switches that communicate with one another according to link layer data communications protocols. Like IP in the network layer, the Ethernet protocol, not the only link-level protocol, nevertheless is so ubiquitous as to be almost synonymous with the link layer. Examples of other link-level protocols include ARP, RARP, NDP, OSPF, and L2TP. Link-level switches connect to other devices, typically on a LAN, through connections referred to as 'ports.' Ports can be implemented as wireless connections as well as wireline connections. Each wireline port is made up of the connectors, interconnections, electrical or optical conductors, and so on, as required to effect connections from the switch to other devices, such other devices including, for example, computers on a LAN, other switches, routers, and so on. Wireless ports may include antennas, amplifiers, other radio components, and the like, as needed to effect wireless communications between a switch and other devices. A switch receives data communications in data units referred to as 'packets.' It is common in the art to refer to link layer data units as 'frames,' but this specification uses the slightly more descriptive term 'packets.' In this specification, the term 'packet' refers to all data units in data communications, including units traveling in the physical layer, in the network layer, and in other layers as well.

In the example of FIG. 1, the switching apparatus (150) includes modular link-level data communications switches (230, 232, 234, 236, 238, 240). In the example of FIG. 1, each data communications switch is a device of the kind sometimes referred to as a bridge, an n-port bridge, a layer-2 switch, a smart switch, or just a 'switch.' Within the scope of the present invention, any link-level switch having a number of ports sufficient to support such connectivity among the networks (A, B, C, D), the switches, and the data communications applications can be improved to carry out link-level data communications according to embodiments of the present invention, including, for example, ordinary Ethernet switches. In many embodiments, however, switches that are improved for link-level data communications according to embodiments of the present invention will be fabric-type switches, Fibre Channel switches, Infiniband switches, Ethernet Fabric switches, and so on.

In the example of FIG. 1, the switching apparatus (150) includes two layers of link-level data communications switches (230, 232, 234, 236, 238, 240), a first layer (244) and a second layer (246). The first layer switches (244) are coupled for data communications to data communications networks (A, B, C, D). In the example of FIG. 1, at least some of the first layer switches (244) are incorporated in one or more link aggregation groups (222, 224, 226, 228) for data communications with the networks, each link aggregation group presenting to at least one of the networks multiple physical links as a single logical link. 'Link aggregation group' ('LAG'), as the term is used here, refers to the use of multiple network cables and ports in parallel to increase link speed beyond the limits of any one single cable or port—and to increase the redundancy for higher availability. A LAG is made up of multiple links that are aggregated together, so that the link aggregation group can be treated as though it were a single link. LAGs are used to 'trunk' links together so that data communications can be distributed and load balanced across the multiple links to provide improved throughput and redundancy compared to a single link. Networks that support link aggregation typically operate a link aggregation protocol that presents multiple physical links to the network as a single logical link. Many LAG implementations conform to an IEEE standard, IEEE 802.1AX. Other terms for link aggregation include 'port teaming,' 'port trunking,' and 'link bundling.'

In the example of FIG. 1, the first layer switches (244) are also coupled to one another for link-level data communications by inter-switch links ('ISL') (100). The ISLs (100) implement the first layer switches in the switching apparatus of FIG. 1 as stacked switches, coupled by high-speed inter-switch links, operating a stacking protocol (257) that shares configuration data and other administrative data across the switches and presenting a single IP address to a system management server for administrative purposes. Examples of stacking protocols that can be utilized for such switch stacking include the Cisco™ Inter-Switch Link protocol, the Cisco™ Dynamic Inter-Switch Link protocol, and so on. The ISLs serve as communications paths among the first-layer switches, but the second layer switches can also be stacked by running the stacking protocol and sharing administrative communications across links (242). The ISLs (100) in FIG. 1 can be embodied, for example, as an Ethernet link over which data communications between switches are encapsulated according the stacking protocol. The ISLs (100) in FIG. 1 can also be embodied, for a further example, as a connection between the Expansion Ports, or E_ports, of two Fibre Channel switches.

In the example of FIG. 1, switches in the switching apparatus are stacked by a stacking protocol (257) that shares administrative configuration information among the switches through the inter-switch links (100), and optionally through links (242), and presents all the switches in the switching apparatus to the networks and to the modular computer systems as a single logical switch. The stacked switches are presented to the networks (A, B, C, D) and to the modular computer systems as a single logical switch in the sense that there is a single IP address for remote administration of the stack of switches as a whole, not an IP address for the administration of each switch within the stack. The stacked switches therefore exhibit the characteristics of a single switch but have the port capacity of the sum of the combined switches.

In the example of FIG. 1, each first layer switch (244) is also coupled for link-level data communications to each of the second layer switches (246). The first layer switches and second layer switches are connected to each other through level-2 data communications links (242). In the example of FIG. 1, each second layer switch (246) is coupled for link-level data communications to at least one of the modular computer systems ($C_1 \ldots C_n$) so that each second layer switch provides data communications connections (250) to the switching apparatus (150) only for data communications applications in the modular computer system to which a second layer switch is coupled.

The link-level data communications switching apparatus (150) of FIG. 1 also includes a plurality of data communications ports. In the example of FIG. 1, at least two of the ports couple the switching apparatus (150) to at least two data communications networks, such as networks A, B, C, and D. In the example of FIG. 1, each network is connected to a plurality of devices that function as sources and destinations of data communications packets traveling between networks. Such source and destination devices in this example include desktop computers (202, 210, 212), a laptop (204), servers (206, 215, 216), and a mobile phone (208).

In the example of FIG. 1, at least two additional ports in the switching apparatus (150) are connected to service applications (254) on at least two of the modular computer systems that carry out transparent, bump-in-the-wire data processing of data communications packets traveling among the networks. The service applications (254) are labeled $A_1 \ldots A_n$ to denote that, although there are only four ports expressly connected to two service applications in this example, in fact a switching apparatus that carries out link-level data communications according to embodiments of the present invention can include any number of connections to any number of bump-in-the-wire service applications. Each service application (254) in FIG. 1 is associated with a unique, link-level identifier (252), designated in this example as $ID_1 \ldots IDA_n$, where $ID_1$ is the link-level identifier for service application $A_1$, $ID_2$ is the link-level identifier for service application $A_2$, and so on through service application $A_n$ and its link-level identifier $ID_n$. Examples of link-level identifiers include a Media Access Control ('MAC') address and a World Wide Name ('WWN') or World Wide Identifier ('WWID'). MAC addresses are used generally in Ethernet addressing, and WWNs or WWIDs are used in other contexts including, for example, Fibre Channel addressing and in Serial Attached SCSI storage networks.

In the example of FIG. 1, the switching apparatus (150) also includes rules (256) governing the steering of data communications among service applications (254) and networks (A, B, C, D) connected to the switching apparatus (150). Each rule is composed of an association of an ingress port and a switch egress. In addition to the association of an ingress port and a switch egress, each rule can optionally also include a network code that identifies two networks between which packets may travel through the switching apparatus and a direction of travel between the two networks. Network codes are further explained with reference to Table 1.

TABLE 1

Network Code Table

| Ingress Port | Network Code |
|---|---|
| $P_1, P_4$ | AB |
| $P_2, P_5, P_7, P_{10}$ | BA |
| $P_3, P_6, P_8, P_{11}$ | CD |
| $P_9, P_{12}$ | DC |

Each record in Table 1 associates a network code with a set of ingress ports. The ingress ports in Table 1 are ports of initial ingress into the switching apparatus (150) from the networks (A, B, C, D). According to the network connections (218) and the inter-switch links in FIG. 1 and the records of Table 1:

packets ingressing through ports $P_1$ and $P_4$, which could travel to Networks B, C, or D, are specified by the first record of Table 1 to be traveling from network A to network B, represented by the network code AB;

packets ingressing through ports $P_2$, $P_5$, $P_7$, and $P_{10}$, which could travel to Networks A, C, or D, are specified by the second record of Table 1 to be traveling from network B to network A, represented by the network code BA;

packets ingressing through ports $P_3$, $P_6$, $P_8$, and $P_{11}$, which could travel to Networks A, B, or D, are specified by the third record of Table 1 to be traveling from network C to network D, represented by the network code CD; and packets ingressing through ports $P_9$ and $P_{12}$, which could travel to Networks A, B, or C, are specified by the fourth record of Table 1 to be traveling from network D to network C, represented by the network code DC.

Readers will recognize that Table 1 illustrates the fact that, given the data communications architecture represented by the network connections (218), specifications of the directions of travel expressed by the network codes, and an initial port of ingress from any network into the switching apparatus, a direction of travel between networks is known.

The rules governing packet steering are further explained with reference to Table 2. Each record of Table 2 represents a packet switching rule governing the steering of data communications among service applications (254) and networks (A, B, C, D) connected to the switching apparatus (150). Each rule associates a switch ingress with a switch egress. Both the switch ingresses and the switch egresses in this example are expressed as a port identifier or port number of a port through which a packet enters or exits a switch. The rules in this example are predefined by a user or system administrator and configured into the switching apparatus (150) in computer memory of some kind, preferably in a high speed ternary content addressable memory or 'TCAM,' but alternatively in Flash memory or EEPROM, a microdisk, ordinary RAM, or other memory as will occur to those of skill in the art. To the extent that the switches of the switching apparatus are stacked, the system administrator may enter the rules once into memory on one switch, and the stacking protocol will distribute the rules among the other switches of the switching apparatus.

TABLE 2

Rules Table

| Rule Number | Switch Ingress | Switch Egress | Network Code |
|---|---|---|---|
| 1 | $P_1$ | $P_{13}$ | AB |
| 2 | $P_4$ | $P_{15}$ | AB |
| 3 | $P_1, P_4$ | $P_{13}, P_{15}$ | AB |
| 4 | LAG-222 | $P_{13}, P_{15}$ | AB |
| 5 | $P_{21}, P_{22}$ | $P_{29}$ | AB |
| 6 | $P_{30}$ | $P_{37}, P_{21}$ | AB |
| 7 | $P_{13}$ | $P_{14}$ | AB |
| 8 | $P_{25}$ | $P_{31}$ | AB |
| 9 | $P_{38}$ | $P_{31}$ | AB |
| 10 | $P_{32}$ | $P_{25}, P_{26}, P_{27}, P_{28}$ | AB |
| 11 | $P_{14}$ | $P_2$ | AB |
| 12 | $P_{16}$ | $P_5$ | AB |
| 13 | $P_{18}$ | LAG-224 | AB |
| 14 | $P_{20}$ | LAG-224 | AB |
| 15 | $P_{14}, P_{16}, P_{18}, P_{20}$ | $P_2, P_5, P_7, P_{10}$ | AB |
| 16 | $P_{14}, P_{16}, P_{18}, P_{20}$ | LAG-224 | AB |
| 17 | $P_3, P_6, P_8, P_{11}$ | $P_{13}, P_{15}, P_{17}, P_{19}$ | CD |
| 18 | $P_{21}, P_{22}, P_{23}, P_{24}$ | $P_{29}$ | CD |
| 19 | $P_{30}$ | $P_{37}, P_{21}$ | CD |
| 20 | $P_{13}$ | $P_{14}$ | CD |
| 21 | $P_{25}$ | $P_{31}$ | CD |
| 22 | $P_{38}$ | $P_{31}$ | CD |
| 23 | $P_{32}$ | $P_{27}, P_{28}$ | CD |
| 24 | $P_{18}$ | LAG-228 | CD |
| 25 | $P_{20}$ | LAG-228 | CD |

Each record in the example of Table 2 represents a packet steering rule composed of an association of an ingress port, a switch egress, and, optionally, a network code. The rules of Table 2 are further explained with reference to the example apparatus of FIG. 1. Rules 1-16 effect link-level data communications between networks A and B so that packets entering the switching apparatus from network A will travel through the switching apparatus only to network B, never to networks C or D. This particular example of rules 1-16 effects link-level data communications from network A to network B only through service applications $A_1$ and $A_n$, although readers will recognize rules can be added to the rules table to govern link-level data communications between additional networks and through any number of service applications.

Rules 1 and 2 steer packets entering the switching apparatus from network A through ports $P_1$ and $P_4$ of switches (230, 232), egressing the packets through ports $P_{13}$ and $P_{15}$ toward switch (238). Rules 3 and 4 are both different forms of rules 1 and 2, included here only for completeness of explanation. The commas in rule 3 indicate a logical 'or' so that rule 3 signifies to switches (230, 232) an instruction to egress through ports $P_{13}$ or $P_{15}$ packets entering through ports $P_1$ or $P_4$. Rule 4 is effectively the same as rule 3 operable for switching apparatus in which ports $P_1$ and $P_4$ are implemented in a LAG, here LAG (222). Rule 4 therefore represents an instruction to switches (230, 232) to egress through ports $P_{13}$ or $P_{15}$ packets entering through the ports composing LAG (222), that is, ports $P_1$ or $P_4$.

Rules 5 steers packets that enter switch (238) through either port $P_{21}$ or port $P_{22}$. Rule 6 egresses packets through port $P_{29}$ to computer $C_1$ for processing by service application $A_1$. Rule 6 steers packets that have been processed by service application $A_1$ and arrive in switch (238) through port $P_{30}$. Rule 6 egresses packets to switch (240) through port $P_{37}$ or port $P_{21}$. Rule 6 steers packets to switch (240) by directing packets that ingress at port $P_{30}$ directly to switch (240) by egressing the packets through $P_{37}$, or indirectly to switch (240) by egressing the packets through port $P_{21}$. Packets that egress though port $P_{21}$ are subsequently ingressed to switch (230) through port $P_{13}$ and egressed from switch (230) through port $P_{14}$ using rule 7. Packets that egress from switch (230) through port $P_{14}$ using rule 7 are subsequently ingressed into switch (240) through port $P_{25}$. Readers will recognize that packets directed from switch (238) to the first-layer switches could be directed to any of the first-layer switches and then back down to switch (240) for further processing by service application $A_n$. This example limits the round trip to the first layer to port $P_{21}$ only for ease of explanation.

Rules 8 and 9 steer packets that ingress through ports $P_{25}$ and $P_{38}$ into switch (240) to computer $C_n$ for processing by service application $A_n$. Rule 8 steers packets that ingress switch (240) through port $P_{25}$ to service application $A_n$ by egressing the packets through port $P_{31}$ to computer $C_n$. Rule 9 steers packets that ingress into switch (240) through port $P_{38}$ to service application $A_n$ by egressing the packets through port $P_{31}$ to computer $C_n$.

Rule 10 steers packets that ingress through port $P_{32}$ into switch (240). According to rule 10, packets will egress from switch (240) either through port $P_{25}$, $P_{26}$, $P_{27}$, or $P_{28}$. Switch (240) can select among $P_{25}$, $P_{26}$, $P_{27}$, or $P_{28}$ in any fashion that may occur to those of skill in the art, randomly, always using the same port, by round-robin load balancing, and so on. In this example, rule 10 has a network code of 'AB,' indicating that the rule is only applied to packets that are traveling from network A to network B. Determining that a packet is traveling from network A to network B can be carried out, for example, by retrieving the network code that is associated with the port through which the packet initially ingressed into the switching apparatus from a table such as Table 1. If the network code that is associated with the ingress port into the switching apparatus for a packet is 'AB,' the packet is traveling from network A to network B.

Rules 11-16 steer packets that ingress into switches (230, 232, 234, 236) to network A. In Table 2, rules 11-16 have a network code of 'AB,' indicating that rules 11-16 are only applied to steer packets that are being transferred from network A to network B as described above. Rule 15 steers packets that ingress switches (230, 232, 234, 236) through ports $P_{14}$, $P_{16}$, $P_{18}$, and $P_{20}$. According to rule 15, a packet that ingresses into switch (230) through port $P_{14}$ will egress to network B through port $P_2$, a packet that ingresses switch (232) through port $P_{16}$ will egress to network B through port $P_5$, a packet that ingresses into switch (234) through port $P_{18}$ will egress to network B through port $P_7$, and a packet that ingresses into switch (236) through port $P_{20}$ will egress to network B through port $P_{10}$. Rule 16 is a duplicate of the functionality of rule 15 and is included here only for completeness of explanation. Rules 11-14 also duplicate the functionality of rule 15 and are also included here only for completeness of explanation.

Rules 17-25 effect link-level data communications between networks C and D so that packets entering the switching apparatus from network C will travel through the switching apparatus only to network D, never to networks A or B. This particular example of rules 17-25 steers packets from network C to network D only through service applications $A_1$ and $A_n$, although readers will recognize rules can be added to the rules table to govern packet steering also from additional networks and through any number of service applications.

Rule 17 steers packets that ingress into switches (230, 232, 234, 236) through ports $P_3$, $P_6$, $P_8$, and $P_{11}$. Rule 17 steers packets to switch (238) by egressing packets through ports $P_{13}$, $P_{15}$, $P_{17}$, and $P_{19}$. Rule 18 steers packets that ingress into switch (238) through ports $P_{21}$, $P_{22}$, $P_{23}$, and $P_{24}$. Rule 18 steers packets to computer $C_1$ by egressing the packets through port $P_{29}$. Rule 19-22, which are duplicates of rules 6-9, steer packets into switch (238), switch (240), computer $C_n$, and back into switch (240) as described above with reference to rules 6-9.

Rule 23 steers packets that ingress into switch (240) through port $P_{32}$. Rule 23 steers packets to switches (234, 236) through egress ports $P_{27}$ or $P_{28}$. Rule 23 includes a network code of 'CD,' and as such, rule 23 is only applied to packets that are traveling from network C to network D. Determining that a packet is traveling from network C to network D can be carried out, for example, by retrieving the network code that is associated with the port through which the packet initially ingressed into the switching apparatus from a table such as Table 1. If the network code that is associated with the ingress port into the switching apparatus for a packet is 'CD,' the packet is traveling from network C to network D.

Rules 24 and 25 steer packets from that ingress switches (234, 236) through ports $P_{18}$ and $P_{20}$. Rules 24 and 25 steer packets to network D through egress ports $P_9$ and $P_{12}$. In Table 2, rules 24 and 25 are only applied if the network code is 'CD,' which indicates that packets are being transferred from network C to network D as described above.

In the example of FIG. 1, because the switches within the switching apparatus (150) are logically stacked to form a single switch image for LAG and application definitions, rules can be written to define ports into and out of the switching apparatus, without creating rules for inter-switch routing. In an example in which packets are steered first to service application $A_1$ and then to service application $A_n$, the example of Table 2 can be made more concise as illustrated in Table 3.

TABLE 3

Rules Table

| Rule Number | Switch Ingress | Switch Egress | Network Code |
|---|---|---|---|
| 1 | $P_1$, $P_4$ | $P_{29}$ | |
| 2 | $P_{30}$ | $P_{31}$ | |

TABLE 3-continued

Rules Table

| Rule Number | Switch Ingress | Switch Egress | Network Code |
|---|---|---|---|
| 3 | $P_{32}$ | LAG-224 | AB |
| 4 | $P_3, P_6, P_8, P_{11}$ | $P_{29}$ | |
| 5 | $P_{32}$ | LAG-228 | CD |

In the example of Table 3, rule 1 steers packets from ingress in the switching apparatus at ports $P_1$ or $P_4$ to egress through port $P_{29}$ toward service application $A_1$. Rule 2 steers packets returning from service application $A_1$ that ingress into the switching apparatus through port $P_{30}$ to service application $A_n$ by egressing the packet from the switching apparatus (150) through port $P_{31}$. Rule 3 steers packets returning from service application $A_n$ that ingress into the switching apparatus through port $P_{32}$ to LAG-224. Rule 3 has a network code of 'AB,' so that rule 3 is only applied to packets traveling from network A to network B. Rule 4 steers packets that ingress into the switching apparatus through ports $P_3$, $P_6$, $P_8$, and $P_{11}$ to service application $A_1$ through egress port $P_{29}$. Rule 5 steers packets returning from service application $A_n$ that ingress into the switching apparatus through port $P_{32}$ to LAG-228. Rule 5 has a network code of 'CD,' so that rule 5 is only applied to packets traveling from network C to network D.

The example switching apparatus of FIG. 1 operates generally by receiving, through an ingress port from a source network, data communications packets directed to a destination network. Each packet in the example of FIG. 1 contains a source network address that identifies the source of the packet in the source network. Each packet also optionally contains a destination network address that identifies a destination of the packet in the destination network. The source of the packet in the first network typically is one of the automated devices connected to the first network, such as, for example, desktop computer (202) or laptop computer (204). Similarly, the destination of the packet in the second network is one of the devices connected to the second network, such as, for example, server (206) or mobile phone (208). The network addresses are OSI layer-3 addresses; in the Internet Protocol, these would be IP addresses, for example. The example switching apparatus of FIG. 1 steers each packet among the service applications and through an egress port to the destination network. In the example of FIG. 1, the steering is carried out only in accordance with the rules (256), without using the link-level identifier of any service application.

In the example of FIG. 1, the switching apparatus steers none of the packets through any of the ISLs among the first-layer switches. Administrative communications may flow through the ISLs among the first-layer switches, including, for example, the sharing of learned associations among ingress ports and network codes, but none of the packets traveling from a source network to a destination network are ever steered across an ISL between any of the first-layer switches. This is a benefit of link-level data communications according to embodiments of the present invention because steering packets through such ISLs is inefficient, always adding at least one additional link to any packet's route among the service applications, often adding more than one link. The switching apparatus can steer packets with no need to traverse first-layer ISLs because of the architecture of the link (242) between the first-layer switches (244) and the second-layer switches (246). The fact that each first layer switch is coupled for link-level data communications to each of the second layer switches means that: there is a path from any network port in the first layer switches to any computer port in the second layer switches; and there is a path from any computer port in the second layer switches to any network port in the first layer switches; and there is a path from any computer port in the second layer switches through any first layer switch to any other computer port in the second layer switch. Further that these paths are available for packet steering without the need to cross any ISL between first layer switches.

Consider, as an example of link-level data communications according to embodiments of the present invention, a packet sent from network A to network B, explained with reference to the rules of Table 2. In this example, one of the data communications devices (202, 204) connected to network A is the source of the packet, and one of the devices (206, 208) connected to network B is the destination of the packet. The packet can be sent over network connections (218) that form LAG (222). A packet sent over network connections (218) that form LAG (222) will ingress to switch (230) through port $P_1$ or into switch (232) through port $P_4$. If the packet ingresses into switch (230) through port $P_1$, the packet will egress from switch (230) through port $P_{13}$ according to rule 1 in Table 2. If the packet ingresses into switch (232) through port $P_4$, the packet will egress from switch (232) through port $P_{15}$ according to rule 1 in Table 2. In both cases, the packet will ingress into switch (238).

The packet in the example above will ingress into switch (238) either through port $P_{21}$ or $P_{22}$. In either case, the packet will egress from switch (238) through port $P_{29}$ as dictated by rules 5 or 18. Readers will recognize that rule 18 effectively includes the packet steering provided by rule 5, so that as a practical matter, rule 5 is not actually required. Rule 5 is nevertheless included here for ease of explanation. A similar comment would apply to rules 6 and 19, 7 and 20, 8 and 21, as well as 9 and 22, each of which is a literal duplicate of the other.

The packet egressing switch (238) through port $P_{29}$ enters computer $C_1$ through port $P_{33}$ where service application $A_1$ processes the packet. The packet then egresses from computer $C_1$ through port $P_{34}$ and ingresses back into switch (238) through port $P_{30}$. The packet egresses from switch (238) through ports $P_{21}$ or $P_{37}$ in accordance with rule 6. If the packet egresses from switch (238) through port $P_{37}$, the packet will ingress into switch (240) through port $P_{38}$. If the packet egresses from switch (238) through port $P_{21}$, the packet will ingress into switch (230) through port $P_{13}$. Such a packet will subsequently egress from switch (230) through port $P_{14}$ according to rule 7 and ingress into switch (240) through port $P_{25}$.

In this example, if the packet ingresses into switch (240) through port $P_{25}$, the packet will egress from switch (240) through port $P_{31}$ in accordance with rule 8. If the packet ingresses into switch (240) through port $P_{38}$, the packet will egress from switch (240) through port $P_{31}$ in accordance with rule 9. In either case, service application $A_n$ will subsequently process the packet, the packet will egress from computer $C_n$ through port $P_{36}$, and the packet will ingress into switch (240) through port $P_{32}$. Once the packet has ingressed into switch (240) through port $P_{32}$, the packet has ingressed through a port that could conceivably trigger rule 10 or rule 23. Rules 10 and 23, however, include a network code that identifies two networks between which packets may travel through the switching apparatus and a direction of travel between the two networks. In this example, rule 10 has a network code of 'AB,' which means that the rule is associated with network traffic that is traveling from network A to network B. Rule 23 has a network code of 'CD,' which means that the rule is associated with network traffic that is traveling from network C to network D. Determining which rule to apply can be carried out, for example, by retrieving the network code that is associated with the port through which the packet initially ingressed into the switching apparatus from a table such as Table 1. If the network code that is associated with the ingress port into the switching apparatus for a packet is 'AB,' the packet is traveling from network A to network B. If the network code that is associated with the ingress port into the switching apparatus for a packet is 'CD,' the packet is traveling from network C to network D. In this example, the packets are ingresssing into the switching apparatus through port $P_2$, which is associated with network code 'AB' and indicates that the packets are traveling from network A to network B. The switching apparatus will therefore identify rule 10 as the appropriate rule to apply. According to rule 10, the packet will egress from switch (240) through either of ports $P_{25}$, $P_{26}$, $P_{27}$, or $P_{28}$. Switch (240) can select among $P_{25}$, $P_{26}$, $P_{27}$, or $P_{28}$ in any fashion that may occur to those of skill in the art, randomly, always using the same port, by round-robin load balancing, and so on.

In this example, a packet that egresses from switch (240) through port $P_{25}$ will ingress switch (230) through port $P_{14}$. A packet that egresses from switch (240) through port $P_{26}$ will ingress switch (232) through port $P_{16}$. A packet that egresses from switch (240) through port $P_{27}$ will ingress switch (234) through port $P_{18}$. A packet that egresses from switch (240) through port $P_{28}$ will ingress switch (236) through port $P_{20}$. In each case, the packet will egress from its respective switch to network B according to rule 15. Rule 16 would also work, but rule 16 is a duplicate of the functionality of rule 15 included here only for completeness of explanation. Rules 11-14 would work here also, but they also are explanatory duplicates of the functionality of rule 15. According to rule 15, a packet that ingresses into switch (230) through port $P_{14}$ will egress to network B through port $P_2$, a packet that ingresses switch (232) through port $P_{16}$ will egress to network B through port $P_5$, a packet that ingresses into switch (234) through port $P_{18}$ will egress to network B through port $P_7$, and a packet that ingresses into switch (236) through port $P_{20}$ will egress to network B through port $P_{10}$.

The example above illustrates that although a packet sent from a particular source network can take a variety of paths, the rules are configured so that the packet always arrives at the destination network. Steering packets in such a way requires using neither the source network address of the packet, the destination network address of the packet, nor the link-level identifier of any service application. Some rules steer only by a switch ingress port and a switch egress, either a port or a LAG. For such rules, inclusion of a network code is optional. Some rules require a network code for proper operation. For rules that are ambiguous according to switch ingress, that is, ingress is through the same port on two or more rules which specify different egresses, such rules operate according to a network code that disambiguate such rules and such rules are selected on the basis of both the ingress port and the network code. Because the packets are not altered, the packets themselves do not specify their network code, and the network code may be identified for each packet through a lookup of a stored association of the packet's source link-level identifier and its network code.

Link-level data communications according to embodiments of the present invention is carried out on a switching apparatus composed of link-level data communications switches. For further explanation, therefore, FIG. 2 sets forth a functional block diagram of automated computing machinery, a link-level data communications switch (230) adapted for link-level data communications according to embodiments of the present invention.

Figure 2:
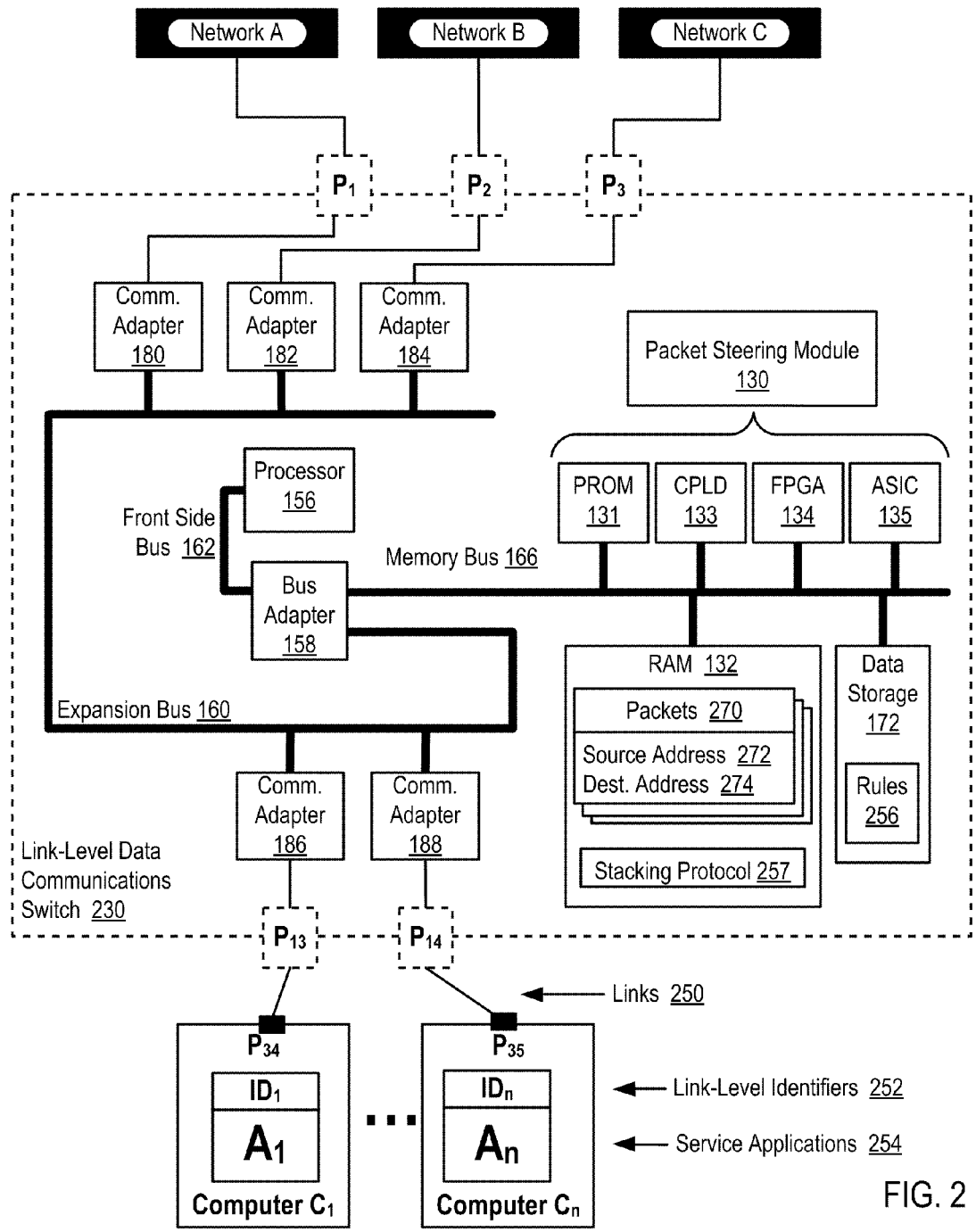
FIG. 2 sets forth a functional block diagram of automated computing machinery, a link-level data communications switch adapted for link-level data communications according to embodiments of the present invention.

The switch (230) of FIG. 2 includes at least one data communications processor (156) as well as random access memory (132) ('RAM') which is connected through a high speed memory bus (166) and bus adapter (158) to processor (156) and to other components of the switch (230). The data communications processor (156) is also operatively coupled through an expansion bus (160) to a number of data communications ports ($P_1$, $P_2$, $P_3$, $P_{13}$, $P_{14}$). The data communications processor can be implemented as any of a variety of computer microprocessors or microcontrollers including, for example, a Motorola 68000™, an IBM POWER™ architecture processor, an Intel Pentium™, and so on. The processor (156) in this example is coupled to the ports through an expansion bus (160) and several communications adapters (180, 182, 184, 186, 188). The communications adapters implement data communications through the ports with other switches, routers, networks (A, B, C), computers, and service applications (254) running on other computers ($C_1$, $C_n$). Such communications are so often networked that a communications adapter is often referred to as a 'network interface card' or 'NIC.' Communications adapters implement the hardware level of data communications through which one computer, router, or switch sends data communications to another computer, router, or switch, directly or through a data communications network. Examples of communications adapters useful for link-level data communications according to embodiments of the present invention include modems for wired dial-up communications, Ethernet (IEEE 802.3) adapters for wired data communications network communications, and 802.11 adapters for wireless data communications network communications.

In the example of FIG. 2, ports $P_1$, $P_2$, and $P_3$ are connected through wireline connections to data communications networks A, B, and C. Ports $P_{13}$ and $P_{14}$ are connected to service applications ($A_1 \ldots A_n$) executing on computers ($C_1 \ldots C_n$). In this example, each port ($P_1$, $P_2$, $P_3$, $P_{13}$, $P_{14}$) is capable of functioning as an ingress port or an egress port for data communications among the networks and the switches. That is, data traffic through the switch (230) is generally bidirectional.

In the example of FIG. 2, the switch also includes data storage (172) operatively coupled to the processor (156). The data storage (172) can be implemented in a number of forms as will occur to those of skill in the art, including, for example, a microdrive or electrically erasable programmable read-only memory ('EEPROM' or 'flash'). The data storage has stored within it rules (256) governing the steering of data communications among the ports of the switch. Whether a port is an ingress port or an egress port is determined by the port's usage for a given packet. If a packet enters the switch through a port, that port is taken as the packet's ingress port for purposes of current rule execution. If a packet is to exit the switch through a port, that port is taken as the packet's egress port for purposes of current rule execution. The rules can associate ingress ports and egress ports in a variety of ways as will occur to those of skill in the art, including, for example, a sequence of C-style structs, a linked list, an array with at least two dimensions, and so on. The data storage is preferably non-volatile and can be configured with the rules by a system administrator or a manufacturer. One form of data storage for the rules, possibly somewhat preferred because of its response speed, is a content addressable memory or 'CAM,' in which the ingress ports and egress port are associated by treating an ingress port number as an address and treating a corresponding egress port number as memory content to be looked up on the basis of an ingress port number. A lookup of a rule in the CAM then is carried out by placing an ingress port number, optionally along with additional information as needed, on an input of the CAM and reading an egress port number from the output of the CAM.

The example switch (230) of FIG. 2 also includes a packet steering module (130), a module of automated computing machinery configured to carry out link-level data communications according to embodiments of the present invention. The packet steering module (130) may be implemented as, for example, a control program stored in random access memory ('RAM') (132) or stored in a programmable read only memory ('PROM') ('131'). Or the packet steering module (130) may be implemented as a complex programmable logic device ('CPLD') (133), a field programmable gate array ('134'), or as an application specific integrated circuit ('ASIC') (135).

The switch (230) in this example steers packets under control of the packet steering module (130) according to embodiments of the present invention by receiving in the switch through an ingress port from the first network data communications packets (136) directed to the second network. Each such packet contains a source network address (272) that identifies the source of the packet in the first network and optionally a destination network address (274) that identifies the destination of the packet in the second network. In the example of FIG. 2, steering packets is carried out only in accordance with the rules, without using the link-level identifier of any service application.

The switch in the example of FIG. 2 receives, in the switch through an ingress port ($P_1$, $P_2$, or $P_3$) from a source network, data communications packets (136) directed to a destination network. Each packet contains a source network address (272) that identifies the source of the packet in the source network, and each packet optionally also contains a destination network address (274) that identifies a destination of the packet in the destination network. The switch in FIG. 2 also steers each packet among the service applications (254) and through an egress port to the destination network, with the steering carried out only in accordance with the rules, without using the link-level identifier (252) of any service application (254).

Figure 3:
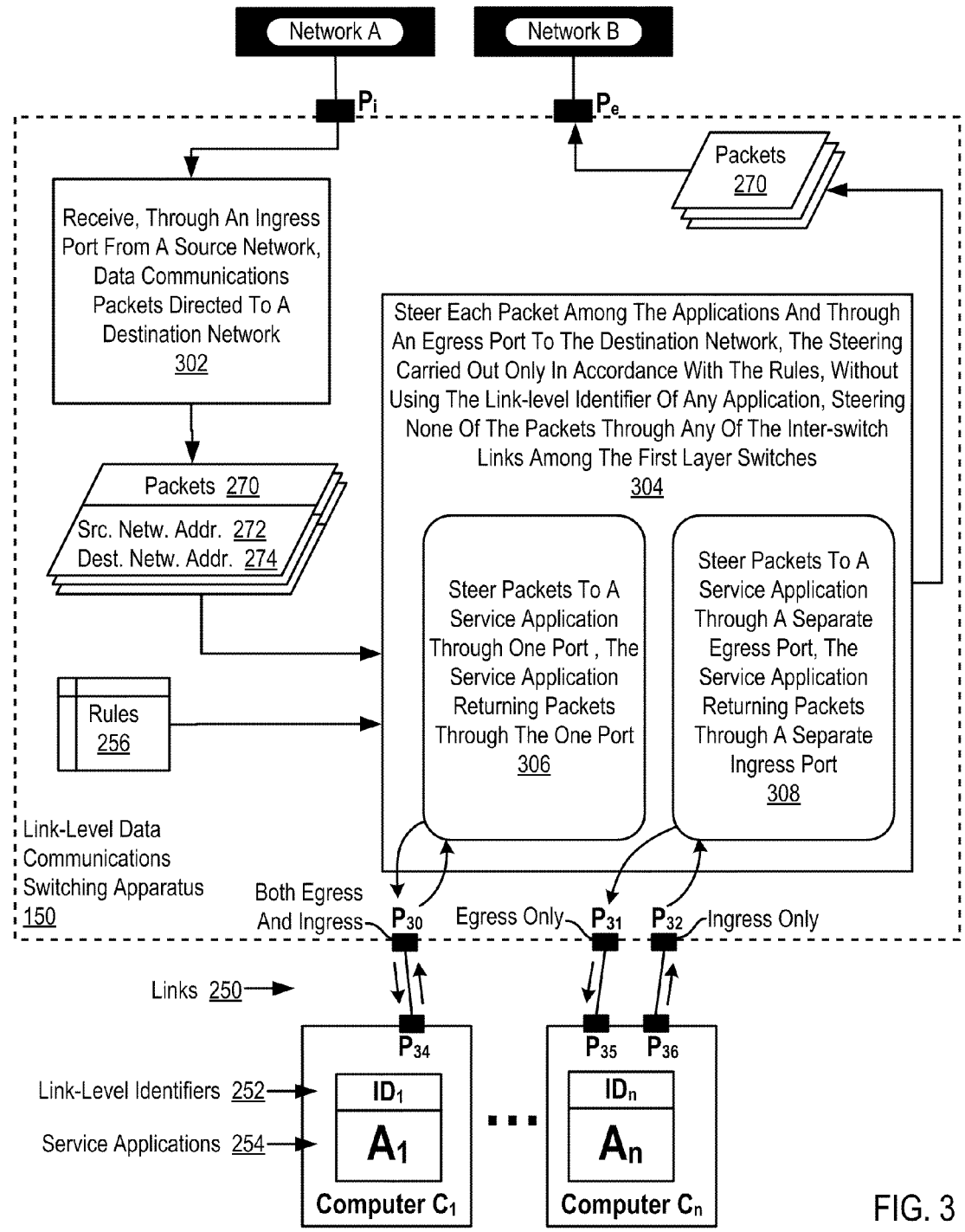
FIG. 3 sets forth a flow chart illustrating an example method of link-level data communications according to embodiments of the present invention.

For further explanation, FIG. 3 sets forth a flow chart illustrating an example method of link-level data communications according to embodiments of the present invention. The method of FIG. 3 is carried out in a link-level data communications switching apparatus (150) like the switching apparatus described above with reference to FIG. 1, and the method of FIG. 3 is discussed here with reference both to FIG. 3 and also to FIG. 1. The link-level data communications switching apparatus (150) includes a first layer (244) and second layer (246) of modular link-level data communications switches. In the example of FIG. 3, the first layer switches (244) are coupled for data communications to data communications networks (A, B, C, D), and the first layer switches are also coupled to one another for link-level data communications by inter-switch links (100). Each first layer switch (230, 232, 234, 236) is also coupled for link-level data communications to each of the second layer switches (246), and each second layer switch (238, 240) is coupled for link-level data communications to at least one of the modular computer systems (104) so that each second layer switch provides data communications connections to the switching apparatus only for service applications (254) in the modular computer system to which a second layer switch is coupled. In the example of FIG. 3, all the switches stacked by a stacking protocol share administrative configuration information among the switches through the inter-switch links (100) and all the switches in the switching apparatus are presented to the networks and to the modular computer systems as a single logical switch.

In the example of FIG. 3, the switching apparatus also includes a plurality of data communications ports. At least two of the ports couple the switching apparatus to at least two data communications networks. The switching apparatus (150) also includes at least two additional ports ($P_{30}$, $P_{31}$, $P_{32}$) connected to service applications (254) that carry out transparent, bump-in-the-wire data processing of data communications packets (270) traveling among the networks. Some ports function as an ingress port ($P_i$, $P_{31}$) only, some ports function as an egress port ($P_e$, $P_{32}$) only, and some ports function as both an ingress port and an egress port ($P_{30}$) for data communications among the networks and the service applications. Each service application in FIG. 3 is associated with a unique, link-level identifier (252) such as a MAC address, a WWID or a WWN.

In the example of FIG. 3, the switching apparatus includes rules (256) which govern the steering of data communications among service applications (254) and networks connected to the switching apparatus (150). Each rule (256) in FIG. 3 includes an association of an ingress port and a switch egress. The rules (256) can optionally include at least one rule that further includes at least one network code that identifies two networks between which packets may travel through the switching apparatus and a direction of travel between the two networks. Such rules may be implemented, for example, as records in a rules table as shown above with reference to Table 2, although readers will recognize that the table data structure is not a limitation of the present invention. In fact, packet steering rules according to embodiments of the present invention can be implemented in a variety of data structures, including, for example, linked lists, multi-dimensional arrays, C-style structs, and so on.

The example of FIG. 3 includes receiving (302), in the switching apparatus (150) through an ingress port ($P_i$) from a source network, data communications packets (270) directed to a destination network. Each packet (270) contains a source network address (272) that identifies the source of the packet in the source network. Each packet optionally also contains a destination network address (274) that identifies a destination of the packet in the destination network. The example of FIG. 3 also includes steering (304) by the switching apparatus (150) each packet (270) among the service applications (254) and through an egress port ($P_e$) to the destination network. In the method of FIG. 3, the steering is carried out only in accordance with the rules (256), without using the link-level identifier (252) of any service application (254). In the example of FIG. 3, the switching apparatus (150) steers none of the packets through any ISLs (100) among first-layer switches (244).

In the example of FIG. 3, the switching apparatus (150) is configured, for at least some of the service applications, with two ports ($P_{31}$, $P_{32}$) coupled to each such service application. One port ($P_{31}$) is for egress of packets (270) from the switching apparatus (150) to such service applications and another port ($P_{32}$) is for ingress of packets from the service applications. In this example, steering (304) each packet (270) among the service applications includes steering (308) each packet from the switching apparatus (150) to such a service application through a separate egress port ($P_{31}$), each such service application carrying out its data processing related to each packet and then returning each packet to the switching apparatus through a separate ingress port ($P_{32}$).

In the example of FIG. 3, the switching apparatus (150) is also configured, for at least some of the service applications, with only one port ($P_{30}$) coupled to a service application. In such an example, steering (304) each packet (270) among the service applications includes steering (306) each packet from the switching apparatus to a service application through the one port ($P_{30}$) coupling such a service application (254) to the switching apparatus, each such service application carrying out its data processing related to each packet and then returning each packet to the switching apparatus through the one port ($P_{30}$).

Figure 4:
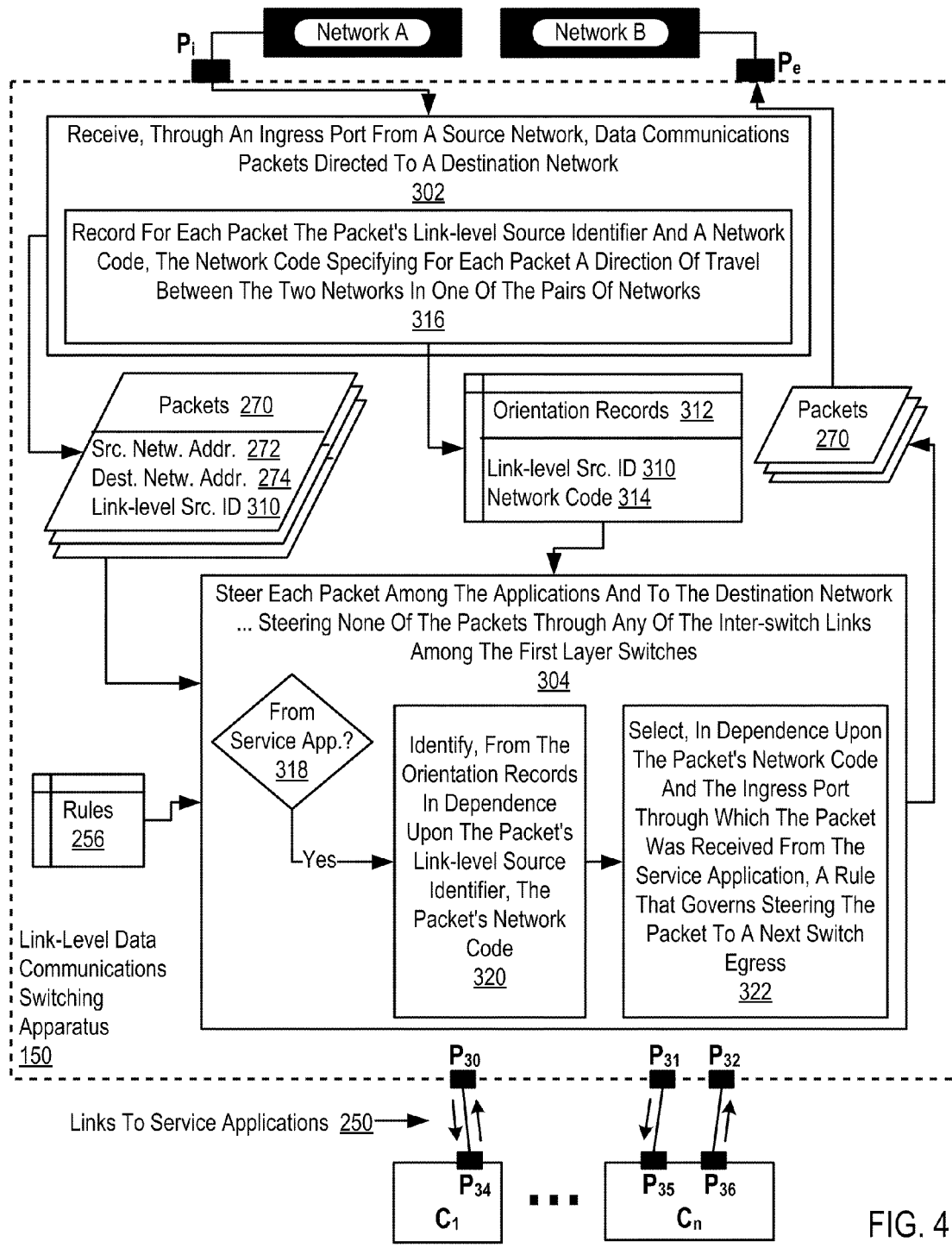
FIG. 4 sets forth a flow chart illustrating an example method of link-level data communications according to embodiments of the present invention.

For further explanation, FIG. 4 sets forth a flow chart illustrating a further example method of link-level data communications according to embodiments of the present invention. The method of FIG. 4, like the method of FIG. 3, is carried out in a link-level data communications switching apparatus (150) similar to the switching apparatus of FIG. 1, and the method of FIG. 4 is discussed here with reference both to FIG. 4 and also to FIG. 1. The switching apparatus includes a first layer (244) and a second layer (246) of link-level data communications switches. The first layer switches (244) are coupled for data communications to data communications networks (A, B, C, D), and the first layer switches are also coupled to one another for link-level data communications by inter-switch links (100). Each first layer switch (230, 232, 234, 236) is also coupled for link-level data communications to each of the second layer switches (246), and each second layer switch (238, 240) is coupled for link-level data communications to at least one of the modular computer systems (104) so that each second layer switch provides data communications connections to the switching apparatus (150) only for service applications in the modular computer system to which a second layer switch is coupled. In the example of FIG. 4, all the switches stacked by a stacking protocol share administrative configuration information among the switches through the inter-switch links (100) and all the switches in the switching apparatus are presented to the networks and to the modular computer systems as a single logical switch.

In the example of FIG. 4, the switching apparatus (150) includes a plurality of data communications ports ($P_i$, $P_e$, $P_{30}$, $P_{31}$, $P_{32}$). At least two of the ports couple the switching apparatus to at least two data communications networks. The switching apparatus (150) also includes at least two additional ports ($P_{30}$, $P_{31}$, $P_{32}$) connected to service applications (254) that carry out transparent, bump-in-the-wire data processing of data communications packets (270) traveling among the networks. Some ports function as an ingress port ($P_i$, $P_{31}$) only, some ports function as an egress port ($P_e$, $P_{32}$) only, and some ports function as both an ingress port and an egress port ($P_{30}$) for data communications among the networks and the service applications. Each service application in FIG. 4 is associated with a unique, link-level identifier (252) such as a MAC address, a WWID, or a WWN.

Like the example of FIG. 3, the example of FIG. 4 includes receiving (302) data communications packets (270) directed to a destination network and steering (304) by the switching apparatus each packet among the service applications and through an egress port to the destination network. Like the example of FIG. 3, in the example of FIG. 4 the steering (304) is carried out only in accordance with the rules, without using the link-level identifier of any service application. In the example of FIG. 4, the switching apparatus (150) steers none of the packets through any ISLs (100) among first-layer switches (244).

In the method of FIG. 4, however, each packet also includes a link-level source identifier (310) that identifies a link-level source for each packet in the source network. In the method of FIG. 4, receiving (302) data communications packets also includes recording (316) for each packet (270) the packet's link-level source identifier (310) and a network code (314) that specifies for each packet a direction of travel between two networks. Readers will recognize that recording such associations between link-level source identifiers and network codes is a method of learning those associations. Recording each packet's link-level source identifier (310) and a network code (314) can be carried out, for example, by recording each such value in a table such as Table 4.

TABLE 4

| Orientation Records | |
|---|---|
| Source Link-Level Identifier | Network Code |
| 123 | AB |
| 234 | AB |
| 345 | AB |
| 456 | BA |
| 567 | BA |

Each record in Table 4 associates a source link-level identifier for a packet that has been received by the switching apparatus with a network code. The association with the network code effectively orients each packet with respect to the packet's direction of travel between two networks. The packet having source link-level identifier '123' in the example of Table 4 is traveling from network A toward network B. The packet having source link-level identifier '456' in the example of Table 4 is traveling from network B toward network A. And so on. Readers will understand that the source link-level identifier in Table 4 can be embodied in many forms according to embodiments of the present application, including, for example, as a MAC address, a WWID, or WWN.

It is a traditional, well-known feature of link-level switches to 'learn' associations of source link-level identifiers and port numbers. This is a well-known feature of link-level switches that reduces the need for burdensome ARP floods or broadcasts to determine which port should be used to egress a packet having a particular source MAC address, for example. Given this traditional feature of link-level switches, it is possible, within the scope of the present invention, to build orientation records according to embodiments of the present invention using the traditional silicon, if the silicon happens to have an unused field in its learning cache in which the network code can be recorded along with a source MAC address and a pertinent port number. Encoding the network codes indicating the four directions of travel represented by AB, BA, CD, and DC, for example, can be accomplished if only two bits of unused storage are available in each learning cache record. This feature is mentioned in some detail here, not because it is a limitation of the present invention, which it is not, but because it may be a somewhat preferred embodiment, allowing a switch to be improved to perform link-level data communications according to embodiments of the present invention with little or no modification of the switch's underlying hardware.

In the example of FIG. 4, steering (304) each packet among the service applications also includes, upon receiving a packet through an ingress port from a source network, selecting, in dependence upon the ingress port through which the packet was received, a rule that governs steering the packet to a switch egress. Selecting, in dependence upon the ingress port through which the packet was received, a rule that governs steering the packet to a switch egress can be carried out, for example, by using the ingress port number to select a rule from a rules table as described above with reference to Table 2.

In the example of FIG. 4, the switching apparatus (150) also includes orientation records (312) that associate, for each packet (270) received from a source network, the packet's link-level source identifier (310) and a network code. In the example of FIG. 4, the network code specifies for each packet a direction of travel between two networks. Orientation records can be embodied, for example, in a table such as Table 4 described above. Orientation records may also be embodied, for example, in an array, linked list, as entries in a database, and so on.

In the example of FIG. 4, steering (304) each packet among the service applications includes, for each packet received through an ingress port from a service application (318), identifying (320), from the orientation records (312) in dependence upon the packet's link-level source identifier (310), the packet's network code. Identifying the packet's network code can be carried out, for example, by performing a lookup in a table that includes orientation records using the packet's link-level source identifier (310).

In the example of FIG. 4, steering (304) each packet among the service applications includes, for each packet received through an ingress port from a service application (318), selecting (322), in dependence upon the packet's network code and the ingress port through which the packet was received from the service application, a rule that governs steering the packet to a next switch egress. Selecting (322), in dependence upon the packet's network code and the ingress port through which the packet was received from the service application, a rule that governs steering the packet to a next switch egress can be carried out, for example, by searching a table such as Table 2 above for records that include a network code and switch ingress that matches the packet's network code and the ingress port through which the packet was received.

Figure 5:
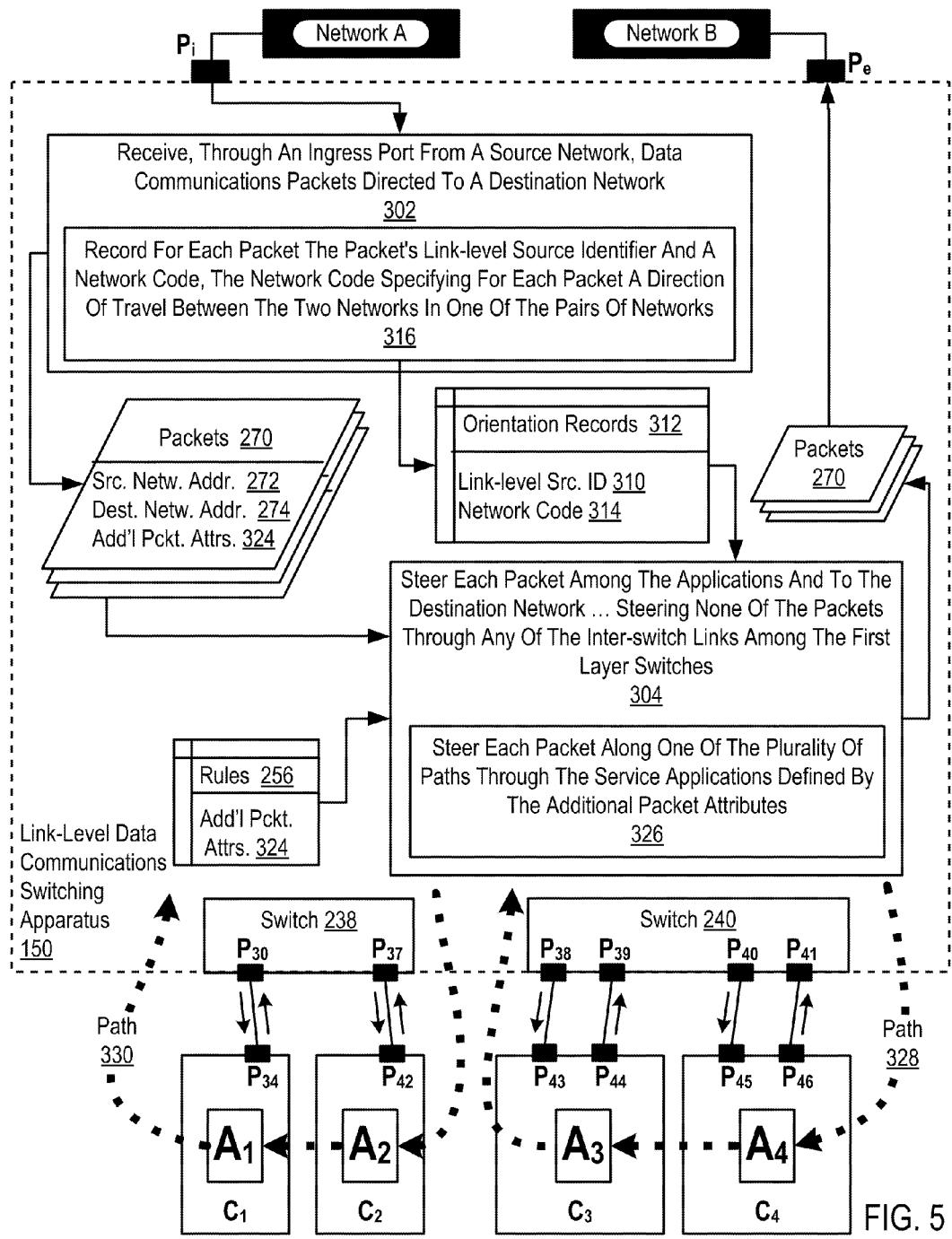
FIG. 5 sets forth a flow chart illustrating an example method of link-level data communications according to embodiments of the present invention.

For further explanation, FIG. 5 sets forth a flow chart illustrating a further example method of link-level data communications according to embodiments of the present invention. The method of FIG. 5, like the method of FIG. 3, is carried out in a link-level data communications switching apparatus (150) like the switching apparatus depicted in FIG. 1, and the method of FIG. 5 is discussed here with reference both to FIG. 5 and also to FIG. 1. The switching apparatus (150) includes a first layer (244) and a second layer (246) of link-level data communications switches like the switching apparatus (150) described above with reference to FIG. 1. The first layer switches (244) are coupled for data communications to data communications networks (A, B, C, D), and the first layer switches are also coupled to one another for link-level data communications by inter-switch links (100). Each first layer switch (230, 232, 234, 236) is also coupled for link-level data communications to each of the second layer switches (246), and each second layer switch (238, 240) is coupled for link-level data communications to at least one of the modular computer systems (104) so that each second layer switch provides data communications connections to the switching apparatus only for service applications in the modular computer system to which a second layer switch is coupled. In the example of FIG. 5, all the switches stacked by a stacking protocol share administrative configuration information among the switches through the inter-switch links (100) and all the switches in the switching apparatus are presented to the networks and to the modular computer systems as a single logical switch.

In the example of FIG. 5, the switching apparatus (150) includes a plurality of data communications ports ($P_i$, $P_e$, $P_{30}$, $P_{37}$, $P_{38}$, $P_{39}$, $P_{40}$, $P_{41}$). At least two of the ports couple the switching apparatus to at least two data communications networks. The switching apparatus (150) also includes at least two additional ports ($P_{30}$, $P_{37}$, $P_{38}$, $P_{39}$, $P_{40}$, $P_{41}$) connected to service applications that carry out transparent, bump-in-the-wire data processing of data communications packets (270) traveling among the networks. In the example of FIG. 5, some ports function as an ingress port ($P_{39}$, $P_{41}$) only, some ports function as an egress port ($P_{38}$, $P_{40}$) only, and some ports function as both an ingress port or an egress port ($P_{30}$, $P_{37}$) for data communications among the networks and the service applications. Each service application in FIG. 5 is associated with a unique, link-level identifier such as a MAC address, a WWID or a WWN.

Like the example of FIG. 3, the example of FIG. 5 includes receiving (302) data communications packets (270) directed to a destination network and steering (304) by the switching apparatus each packet among the service applications and through an egress port to the destination network. Like the example of FIG. 3, in the example of FIG. 5 the steering (304) is carried out only in accordance with the rules, without using the link-level identifier of any service application. Also like the example of FIG. 3, in the example of FIG. 5, the switching apparatus (150) steers none of the packets through any ISLs (100) among first-layer switches (244).

In the method of FIG. 5, however, the rules (256) include additional packet attributes (324) which define a plurality of paths (328, 330) through the service applications for a direction of travel between networks. The switching apparatus (150) can utilize the additional packet attributes to provide different processing for packets that would otherwise be processed identically—packets that ingress into the switching apparatus and egress from the switching apparatus through the same ports. Additional packet attributes can include, for example, a priority attribute, an attribute that identifies the type of service application that generated the packet, and many other attributes that will occur to those of skill in the art. Rules 1-16 in Table 2 define a single path through service applications $A_1$ and $A_n$ for packets traveling from network A to network B. Rules 17-25 in Table 2 define a single path through service applications $A_1$ and $A_n$ for packets traveling from network C to network D. The additional packet attributes make possible a plurality of paths through service applications for a particular direction of travel between two networks by providing additional coding information for packet steering.

In the method of FIG. 5, steering (304) each packet (270) among the service applications includes steering (326) each packet along one of the plurality of paths (328, 330) through the service applications defined by the additional packet attributes (324). In the example of FIG. 5, the additional packet attributes (324) are included as part of each packet (270). Additional packet attributes can be included in each packet, for example, by inserting VLAN tags into the packets in accordance with the IEEE 802.1Q specification. The switching apparatus (150) uses the additional packet attributes (324) that are contained in the packet (270), along with the rules that include additional packet attributes, to steer the packets along one of the plurality of paths (328, 330).

Consider, for example, a case in which lower priority packets should be processed through path (330) in FIG. 5 and higher priority packets should be processed through path (328). In such an example, the rules (256) would include an additional packet attribute of 'priority,' and the rules would be configured so that packets with a lower priority would ingress and egress through the ports in such a way that the packets would be processed by service applications $A_2$ and $A_1$, so that the packets would follow path (330). In this example, the rules (256) would also be configured so that packets with a higher priority would ingress and egress through the ports in such a way that the packets would be processed by service applications $A_4$ and $A_3$, so that the packets would follow path (328). In this example, VLAN tags could be inserted into the packets using the Priority Code Point ('PCP') field in the VLAN tag to specify the priority of the packet. The switching apparatus (150) could extract the value in the PCP field and identify the appropriate rule to apply in dependence upon not only the ingress port and network code as described above, but also in dependence upon the additional packet attribute of priority.

As mentioned, the additional packet attributes make possible a plurality of paths through service applications for a particular direction of travel between two networks by providing additional coding information for packet steering. The use of additional packet attributes is further illustrated with reference to Table 5 below.

TABLE 5

Rules Table

| Rule Number | Switch Ingress | Switch Egress | Additional Packet Attribute | Network Code |
|---|---|---|---|---|
| 1 | $P_2, P_5, P_7, P_{10}$ | $P_{14}, P_{16}, P_{18}, P_{20}$ | 80 | BA |
| 2 | $P_{25}, P_{26}, P_{27}, P_{28}$ | $P_{40}$ | 80 | BA |
| 3 | $P_{41}$ | $P_{38}$ | 80 | BA |
| 4 | $P_{39}$ | $P_{25}, P_{26}$ | 80 | BA |
| 5 | $P_{14}, P_{16}$ | $P_1, P_4$ | 80 | BA |
| 6 | $P_2, P_5, P_7, P_{10}$ | $P_{13}, P_{15}, P_{17}, P_{19}$ | 110 | BA |
| 7 | $P_{21}, P_{22}, P_{23}, P_{24}$ | $P_{37}$ | 110 | BA |
| 8 | $P_{37}$ | $P_{30}$ | 110 | BA |
| 9 | $P_{30}$ | $P_{21}, P_{22}$ | 110 | BA |
| 10 | $P_{13}, P_{15}$ | $P_1, P_4$ | 110 | BA |

The rules of Table 5 steer packets through the switching apparatus (150) with switches (238, 240) modified as shown in FIG. 5 and all other apparatus configured as shown in FIG. 1. In the example of Table 5, additional packet information is encoded as the type of data communications application that generated the packet at its source. In particular, the additional packet attribute value 80 in rules 1-5 is the well known port number for HTTP packets generated by a browser or a web server, and the additional packet attribute value of 110 in rules 6-10 is the well known port number for Post Office Protocol 3 packets generated from an email client or an email server. The well known port numbers 80 and 110 are numerical identifiers for the data structures at the endpoints for communications between a data communications source and a destination, not to be confused with the data communications hardware ports discussed throughout this specification. The rules of Table 5, by use of the well known port numbers for HTTP and POP communications, define two paths through the service applications $A_1, A_2, A_3$, and $A_4$ for packet travel from network B to network A, one path for World Wide Web packets defined by rule 1-5 and a second path for email packets defined by rules 6-10. In this way, two different sets of service applications can be configured to provide different kinds of service processing for these two different kinds of packets, despite the fact that both kinds of packet are traveling between the same two networks in the same direction through the switching apparatus.

In the example of Table 5, and in other examples described above in this specification, a rule includes a network code that identifies two networks between which packets may travel and a direction of travel between the two networks. The inclusion of a network code in a rule is used in this specification for explanation of a class of embodiments that may be somewhat preferred because of their flexibility, but the network code is not required in all embodiments to carry out link-level data communications according to the present application. Link-level data communications can be carried out without the use of a network code, for example, by:

implementing fixed steering from an input port to output port in all switches in the switching structure by rules that implemented a fixed relationships among all ingress ports and all switch egresses in the switching apparatus, including in the rules, in association with the ingress ports and switch egresses, a link-level identifier such as a MAC address, so that the rules effectively subset at the link level for particular sources of data communications, or including in the rules, in association with the ingress ports and switch egresses, a source network address such as an IP address, effectively subsetting the rules at the network level for particular sources of data communications.

Exemplary embodiments of the present invention are described largely in the context of a fully functional computer system for steering data communications packets for transparent, bump-in-the-wire processing among service applications. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of link-level data communications, the method carried out in a link-level data communications switching apparatus, the switching apparatus comprising modular link-level data communications switches disposed within a modular computer cabinet, the modular computer cabinet also having disposed within it a plurality of modular computer systems;

the switching apparatus configured as two layers of link-level data communications switches, a first layer and a second layer, the first layer switches coupled for data communications to data communications networks, the first layer switches also coupled to one another for link-level data communications by inter-switch links, each of the first layer switches also coupled for link-level data communications to each of the second layer switches, each of the second layer switches coupled for link-level data communications to at least one of the modular computer systems so that each of the second layer switches provides data communications connections to the switching apparatus only for service applications in the modular computer system to which a second layer switch is coupled;

all the first layer switches and second layer switches stacked by a stacking protocol that shares administrative configuration information among the first layer switches and second layer switches through the inter-switch links and presents all the first layer switches and second layer switches in the switching apparatus to the networks and to the modular computer systems as a single logical switch;

the switching apparatus further comprises a plurality of data communications ports, at least two of the ports coupling the switching apparatus to at least two data communications networks, at least two additional ports connected to service applications on at least two of the modular computer systems that carry out transparent, bump-in-the-wire data processing of data communications packets traveling among the networks, each of the service applications associated with a unique, link-level identifier;

the switching apparatus further comprises rules governing steering of data communications among the service applications and networks connected to the switching apparatus, each rule comprising an association of an ingress port and a switch egress, wherein the rules include at least one rule that further includes at least one network code that identifies two networks between which data communications packets may travel through the switching apparatus and a direction of travel between the two networks;

the switching apparatus further comprises orientation records that associate, for each of the data communications packets received from a source network, a link-level source identifier of the data communications packets and a network code specifying for each of the data communications packets a direction of travel between two networks;

the method comprising:

receiving, in the switching apparatus through an ingress port from a source network, data communications packets directed to a destination network, each of the data communications packets containing a source network address that identifies a source of the data communication packet in the source network, each of the data communications packets optionally also containing a destination network address that identifies a destination of the data communications packet in the destination network, wherein each of the data communications packets further comprises a link-level source identifier that identifies a link-level source for each of the data communications packets in the source network; and steering by the switching apparatus each of the data communications packets among the applications and through an egress port to the destination network, such steering carried out only in accordance with the rules, without using the link-level identifier of any service application, steering none of the data communications packets through any of the inter-switch links among the first layer switches, including:

identifying, from the orientation records in dependence upon the data communications packet's link-level source identifier, the data communications packet's network code for the direction of travel between networks; and selecting, in dependence upon the data communications packet's network code and the ingress port through which the data communications packet was received from the service application, a rule that governs steering the data communications packet to a next switch egress.

2. The method of claim 1 wherein at least some of the first layer switches are incorporated in one or more link aggregation groups for data communications with the networks, each link aggregation group presenting to at least one physical link of the networks as a single logical link.

3. The method of claim 1 wherein:

the switching apparatus is configured, for at least some of the service applications, with two ports coupled to each such service application, one port for egress of data communications packets from the switching apparatus to such service applications and another port for ingress of data communications packets from such service applications; and the step of steering each of the data communications packets among the service applications further comprises steering each of the data communications packets from the switching apparatus to such a service application through a separate egress port, each such service application carrying out its data processing related to each of the data communications packets and then returning each of the data communications packets to the switching apparatus through a separate ingress port.

4. The method of claim 1 wherein:

the switching apparatus is configured, for at least some of the service applications, with only one port coupled to each such service application; and the step of steering each of the data communications packets among the service applications further comprises steering each of the data communications packets from the switching apparatus to the service application through the one port coupling the service application to the switching apparatus, each such service application carrying out its data processing related to each of the data communications packets and then returning each of the data communications packets to the switching apparatus through the one port.

5. The method of claim 1 wherein the step of steering each of the data communications packets among the applications further comprises, upon receiving a data communications packet through an ingress port from a source network, selecting, in dependence upon the ingress port through which the packet was received, a rule that governs steering the packet to the switch egress.

6. The method of claim 1 wherein:

the rules, in addition to the ingress port and the switch egress, also include additional data communications packet attributes, the additional data communications packet attributes defining a plurality of paths among the service applications; and the step of steering each of the data communications packets among the service applications further comprises steering each of the data communications packets along one of the plurality of paths among the service applications defined by the additional packet attributes.

7. Apparatus for link-level data communications, the apparatus comprising:

a link-level data communications switching apparatus, the switching apparatus comprising modular link-level data communications switches disposed within a modular computer cabinet, the modular computer cabinet also having disposed within it a plurality of modular computer systems;

the switching apparatus configured as two layers of link-level data communications switches, a first layer and a second layer, the first layer switches coupled for data communications to data communications networks, the first layer switches also coupled to one another for link-level data communications by inter-switch links, each of the first layer switches also coupled for link-level data communications to each of the second layer switches, each of the second layer switches coupled for link-level data communications to at least one of the modular computer systems so that each of the second layer switches provides data communications connections to the switching apparatus only for service applications in the modular computer system to which a second layer switch is coupled;

all the first layer switches and second layer switches stacked by a stacking protocol that shares administrative configuration information among the first layer switches and second layer switches through the inter-switch links and presents all the first layer switches and second layer switches in the switching apparatus to the networks and to the modular computer systems as a single logical switch;

the switching apparatus further comprises a plurality of data communications ports, at least two of the ports coupling the switching apparatus to at least two data communications networks, at least two additional ports connected to service applications on at least two of the modular computer systems that carry out transparent, bump-in-the-wire data processing of data communications packets traveling among the networks, each of the service applications associated with a unique, link-level identifier;

the switching apparatus further comprises rules governing steering of data communications among the service applications and networks connected to the switching apparatus, each rule comprising an association of an ingress port and a switch egress, wherein the rules include at least one rule that further includes at least one network code that identifies two networks between which data communications packets may travel through the switching apparatus and a direction of travel between the two networks;

the switching apparatus further comprises orientation records that associate, for each of the data communications packets received from a source network, a link-level source identifier of the data communications packets and a network code specifying for each of the data communications packets a direction of travel between two networks;

the apparatus configured to carry out the steps of:

receiving, in the switching apparatus through an ingress port from a source network, data communications packets directed to a destination network, each of the data communications packets containing a source network address that identifies a source of the data communication packet in the source network, each of the data communications packets optionally also containing a destination network address that identifies a destination of the data communications packet in the destination network, wherein each of the data communications packets further comprises a link-level source identifier that identifies a link-level source for each of the data communications packets in the source network; and steering by the switching apparatus each of the data communications packets among the applications and through an egress port to the destination network, such steering carried out only in accordance with the rules, without using the link-level identifier of any service application, steering none of the data communications packets through any of the inter-switch links among the first layer switches, including:

identifying, from the orientation records in dependence upon the data communications packet's link-level source identifier, the data communications packet's network code for the direction of travel between networks; and selecting, in dependence upon the data communications packet's network code and the ingress port through which the data communications packet was received from the service application, a rule that governs steering the data communications packet to a next switch egress.

8. The apparatus of claim 7 wherein at least some of the first layer switches are incorporated in one or more link aggregation groups for data communications with the networks, each link aggregation group presenting to at least one physical link of the networks as a single logical link.

9. The apparatus of claim 7 wherein:

the rules, in addition to the ingress port and the switch egress, also include additional data communications packet attributes, the additional data communications packet attributes defining a plurality of paths among the service applications; and the step of steering each of the data communications packets among the service applications further comprises steering each of the data communications packets along one of the plurality of paths among the service applications defined by the additional packet attributes.

10. The apparatus of claim 7 wherein:

the switching apparatus is configured, for at least some of the service applications, with two ports coupled to each such service application, one port for egress of data communications packets from the switching apparatus to such service applications and another port for ingress of data communications packets from such service applications; and the step of steering each of the data communications packets among the service applications further comprises steering each of the data communications packets from the switching apparatus to such a service application through a separate egress port, each such service application carrying out its data processing related to each of the data communications packets and then returning each of the data communications packets to the switching apparatus through a separate ingress port.

11. The apparatus of claim 7 wherein:

the switching apparatus is configured, for at least some of the service applications, with only one port coupled to each such service application; and the step of steering each of the data communications packets among the service applications further comprises steering each of the data communications packets from the switching apparatus to the service application through the one port coupling the service application to the switching apparatus, each such service application carrying out its data processing related to each of the data communications packets and then returning each of the data communications packets to the switching apparatus through the one port.

12. The apparatus of claim 7 wherein the step of steering each of the data communications packets among the applications further comprises, upon receiving a data communications packet through an ingress port from a source network, selecting, in dependence upon the ingress port through which the packet was received, a rule that governs steering the packet to the switch egress.

13. A computer program product for link-level data communications carried out in a link-level data communications switching apparatus, the computer program product disposed in recordable medium, wherein the medium is not a signal, for machine-readable information, the switching apparatus comprising modular link-level data communications switches disposed within a modular computer cabinet, the modular computer cabinet also having disposed within it a plurality of modular computer systems;

the switching apparatus configured as two layers of link-level data communications switches, a first layer and a second layer, the first layer switches coupled for data communications to data communications networks, the first layer switches also coupled to one another for link-level data communications by inter-switch links, each of the first layer switches also coupled for link-level data communications to each of the second layer switches, each of the second layer switches coupled for link-level data communications to at least one of the modular computer systems so that each of the second layer switches provides data communications connections to the switching apparatus only for service applications in the modular computer system to which a second layer switch is coupled;

all the first layer switches and second layer switches stacked by a stacking protocol that shares administrative configuration information among the first layer switches and second layer switches through the inter-switch links and presents all the first layer switches and second layer switches in the switching apparatus to the networks and to the modular computer systems as a single logical switch;

the switching apparatus further comprises a plurality of data communications ports, at least two of the ports coupling the switching apparatus to at least two data communications networks, at least two additional ports connected to service applications on at least two of the modular computer systems that carry out transparent, bump-in-the-wire data processing of data communications packets traveling among the networks, each of the service applications associated with a unique, link-level identifier;

the switching apparatus further comprises rules governing steering of data communications among the service applications and networks connected to the switching apparatus, each rule comprising an association of an ingress port and a switch egress, wherein the rules include at least one rule that further includes at least one network code that identifies two networks between which data communications packets may travel through the switching apparatus and a direction of travel between the two networks;

the switching apparatus further comprises orientation records that associate, for each of the data communications packets received from a source network, a link-level source identifier of the data communications packets and a network code specifying for each of the data communications packets a direction of travel between two networks;

the computer program product comprising computer program instructions which, when executed by a data communications processor, cause the switching apparatus to carry out the steps of:

receiving, in the switching apparatus through an ingress port from a source network, data communications packets directed to a destination network, each of the data communications packets containing a source network address that identifies a source of the data communication packet in the source network, each of the data communications packets optionally also containing a destination network address that identifies a destination of the data communications packet in the destination network, wherein each of the data communications packets further comprises a link-level source identifier that identifies a link-level source for each of the data communications packets in the source network; and steering by the switching apparatus each of the data communications packets among the applications and through an egress port to the destination network, such steering carried out only in accordance with the rules, without using the link-level identifier of any service application, steering none of the data communications packets through any of the inter-switch links among the first layer switches, including:

identifying, from the orientation records in dependence upon the data communications packet's link-level source identifier, the data communications packet's network code for the direction of travel between networks; and selecting, in dependence upon the data communications packet's network code and the ingress port through which the data communications packet was received from the service application, a rule that governs steering the data communications packet to a next switch egress.

14. The computer program product of claim 13 wherein at least some of the first layer switches are incorporated in one or more link aggregation groups for data communications with the networks, each link aggregation group presenting to at least one physical link of the networks as a single logical link.

15. The computer program product of claim 13 wherein:

the switching apparatus is configured, for at least some of the service applications, with two ports coupled to each such service application, one port for egress of data communications packets from the switching apparatus to such service applications and another port for ingress of data communications packets from such service applications; and the step of steering each of the data communications packets among the service applications further comprises steering each of the data communications packets from the switching apparatus to such a service application through a separate egress port, each such service application carrying out its data processing related to each of the data communications packets and then returning each of the data communications packets to the switching apparatus through a separate ingress port.

16. The computer program product of claim 13 wherein:

the switching apparatus is configured, for at least some of the service applications, with only one port coupled to each such service application; and the step of steering each of the data communications packets among the service applications further comprises steering each of the data communications packets from the switching apparatus to the service application through the one port coupling the service application to the switching apparatus, each such service application carrying out its data processing related to each of the data communications packets and then returning each of the data communications packets to the switching apparatus through the one port.

17. The computer program product of claim 13 wherein the step of steering each of the data communications packets among the applications further comprises, upon receiving a data communications packet through an ingress port from a source network, selecting, in dependence upon the ingress port through which the packet was received, a rule that governs steering the packet to the switch egress.

18. The computer program product of claim 13 wherein:

the rules, in addition to the ingress port and the switch egress, also include additional data communications packet attributes, the additional data communications packet attributes defining a plurality of paths among the service applications; and the step of steering each of the data communications packets among the service applications further comprises steering each of the data communications packets along one of the plurality of paths among the service applications defined by the additional packet attributes.

* * * * *